United States Patent [19]

Bloomfield

[11] 4,341,041
[45] Jul. 27, 1982

[54] EXPLOSION RELIEF MEANS

[75] Inventor: Dennis G. Bloomfield, Stourbridge, England

[73] Assignee: Steetley Engineering Limited, West Midlands, England

[21] Appl. No.: 133,492

[22] Filed: Mar. 21, 1980

[51] Int. Cl.³ ............................................. E05B 65/10
[52] U.S. Cl. ..................................... 49/141; 220/314; 220/89 A
[58] Field of Search ................ 49/141, 394, 383, 385, 49/402; 220/203, 207, 314, 316, 334, 89 A; 292/259, 259 A, 264

[56] References Cited

U.S. PATENT DOCUMENTS

| 781,080 | 1/1905 | Lynch | 292/264 X |
| 1,200,102 | 10/1916 | Halket | 220/314 |
| 2,349,137 | 5/1944 | Brown | 220/314 X |
| 3,370,745 | 2/1968 | Parkes et al. | 220/89 A |
| 3,433,387 | 3/1969 | Wilson et al. | 220/89 A |
| 4,145,259 | 3/1979 | Leumann | 220/314 X |

FOREIGN PATENT DOCUMENTS

| 536877 | 5/1941 | United Kingdom . |
| 580758 | 9/1946 | United Kingdom . |
| 629815 | 9/1946 | United Kingdom . |
| 678265 | 9/1952 | United Kingdom . |
| 714,563 | 9/1954 | United Kingdom . |
| 1333895 | 10/1973 | United Kingdom . |

Primary Examiner—Kenneth Downey
Attorney, Agent, or Firm—Klarquist, Sparkman, Campbell, Leigh, Whinston & Dellett

[57] ABSTRACT

A processing plant involving the heat treatment of materials which are in finely divided state is provided with explosion relief means afforded by a door pivotally mounted across an opening in the wall of the plant. A lip of the door engages a resilient seal extending around the periphery of the opening, and the door is held in a closed position by a rupturable element which breaks when the pressure within the plant rises above a predetermined pressure to allow the door to open. There is additionally provided, extending across the door, an elongate tension member which is operative, subsequent to initial opening movement of the door, to apply a force to cause the door to return to its closed position, to minimise the subsequent drawing into the plant through the opening of air.

19 Claims, 19 Drawing Figures

FIG.2

Test No. 1

6 lbf/in² 200 ms

FIG. 6A 3 lbf/in² 100 ms

FIG. 6B

Test N° 2

6 lbf/in² { ⌇⌇⌇ }
200 ms

FIG. 7

Test N° 3

6 lbf/in² { ⌇⌇⌇ }
200 ms

FIG. 8 A

6lbf/in² 200ms

FIG. 8B

Test No. 4

3lbf/in² 50ms

Test N°·5

3 lbf/in² { ⊥⊥⊥
       50 ms

FIG. 10A 3 lbf/in² { ⊥⊥⊥
       200 ms

FIG. 10B

Test. N° 6

$3 lbf/in^2$ 50 ms

FIG. 11A $3 lbf/in^2$ 200 ms

| Test No. | Per cent Propane | Maximum Pressure lbf/in² | | | Maximum rate of pressure rise lbf/in²/s |
|---|---|---|---|---|---|
| | | 1st. peak | 2nd. peak | 3rd peak | |
| 1 | 2.6 | 4.7 | 3.6 | 2.2 | 35 |
| 2 | 3.5 | 6.0 | 6.6 | — | 67 |
| 3 | 3.25 | 4.8 | 4.8 | — | 49 |
| 4 | 3.5 | 5.1 | — | — | 56 |
| 5 | 4.0 | 7.1 | 6.8 | — | 94 |
| 6 | 3.0 | 4.2 | 2.4 | 7.4 | 38 |

EXPLOSION RELIEF MEANS

BACKGROUND OF THE INVENTION
1. Field of the Invention

This invention is concerned with improvements in or relating to explosion relief means, particularly for large processing plants in which finely divided materials are subjected to heat treatment.

2. Description of the Prior Art

In many processing plants, particularly large processing plants involving heat treatment of materials which are in a finely-divided granulated or dust-like state, it is a requirement that pressure relief means be provided which is operative in the event that the pressure within the plant rises substantially above the working pressure, to minimise damage caused to the plant in the event of an internal explosion.

In plant operating at low internal pressure (e.g. 10 lbs/sq.ft) the pressure relief means is conveniently in the form of one or more doors which are normally closed, but which open automatically in the event of a rise in pressure within the plant above a predetermined maximum safe pressure.

However, in certain types of processing plants, particularly those operating at high temperature, and at high internal pressure, (viz. upwards of 60 lbs/sq.ft) difficulties are encountered by the use of doors as pressure relief means. One of the difficulties is that it is necessary to vent the excess pressure rapidly over a wide surface area, thus necessitating the provision of large pressure relief openings (for example, upwardly of 2 foot in diameter) and consequently large pressure relief doors. In addition, in a plant which is operating at high internal working pressures (greater than 60 lbs/sq.ft) it is necessary to provide robust securing means to retain the door closed against the normal working pressure of the plant.

For this reason, one is faced with the alternative, either of providing a relatively heavy, and physically stable door which may be sealed completely around the relief opening with a low pressure, or a lighter door which, because of a tendency to "move" upon its mounting, requires a higher pressure to obtain a satisfactory seal against the internal working pressure. However, heavy doors are also disadvantageous, because their momentum causes them to take a long time to be moved to their open positions, and are consequently less effective in venting an internal plant explosion.

It is additionally desirable to provide explosion relief means which comes into operation at as small an excess over working pressure as possible, for example, a relief means which comes into operation at twice the working pressure. This necessarily imposes a limitation on the sealing pressure which may be applied to the doors upon closure thereof.

Heretofore, it has been necessary to a large extent to provide pressure relief doors which are operable at a pressure higher than that which would otherwise be preferred, in order to obtain satisfactory sealing of the doors around the relief openings.

As an alternative to the use of doors, there may be provided as pressure relief means panels which will be ruptured, broken or made otherwise ineffective in containing the atmosphere within the plant when the pressure within the plant rises substantially above the working pressure.

However, it has been found that, in for example coal pre-heating plants, which typically operate at a temperature of 260° C. a pressure of 290 lbs/sq.ft., when an internal explosion occurs, rendering the explosion relief means operative, subsequent to the explosion, and during the period of time whilst the plant is being run down, any air drawn into the plant may cause a further explosion, and that this further explosion may be more violent than the initial explosion.

For these reasons, there has been a tendency to rely upon safety features incorporated into the operational control of the plant, under which (for example) the plant is shut down automatically should the oxygen content in the atmosphere within the plant rise above a level which is considered to be a safe limit.

This is inconvenient, and may cause the plant to be shut down unnecessarily, or unnecessarily frequently. In addition, because of the length of time taken for the plant to run down, it may be necessary to provide some explosion relief in the event of an explosion occurring within the plant during run down.

It is one of the various objects of this invention to provide explosion relief means for use in a plant operating at high internal pressures, which may conveniently be closed to provide an adequate seal against escape of the internal atmosphere of the plant, but will readily move to an open position to vent any build up of pressure within the plant.

SUMMARY OF THE INVENTION

According to this invention there is provided explosion relief means adapted to be mounted over an opening in a processing plant, to provide relief for the plant in the event of an internal explosion, said relief means comprising:

(a) a mounting device adapted to be secured to the plant adajacent to the opening;

(b) a securing device adapted to be secured to the plant on the side of the opening generally opposite to the mounting device;

(c) a door assembly to be mounted on the mounting device for pivotal movement relative thereto; and (d) closing mechanism operative between the door assembly and the securing device to hold the door assembly in a closed position relative to the opening, said closing mechanism comprising a rupturable element which breaks when the pressure within the plant rises above a predetermined pressure, to allow the door assembly to move to an open position.

Conveniently the door assembly comprises a supporting arm, one end portion of which is adapted to be pivotally mounted on the mounting device, and the other end portion of which is adapted to be engaged by part of the closing mechanism. Advantageously the door assembly also comprises a door, preferably mounted on the supporting arm for pivotal movement relative thereto, means being provided which is adjustable to cause pivotal movement of the door relative to the supporting arm to a desired position, and to restrain subsequent pivotal movement relative to said supporting arm to ensure a correct angle of approach between the door and the part of the plant surrounding the relief opening, on movement of the door into its closed position.

Preferably a resilient sealing member is provided, which is adapted to be secured to the plant around the opening, a peripheral edge portion of the door, which is adapted when the door assembly is closed to engage the sealing member, being tapered.

Preferably the closing mechanism comprises means to transmit forces tending to open the door assembly to the rupturable element as shear forces. Preferably such means is operative to transmit such forces, as a force acting on a central region of the rupturable element in one direction, and forces acting on outer portions of the rupturable element in parallel directions opposite to said one direction.

Most conveniently said means comprises a fork and clevis joint, the rupturable element affording a coupling element of the fork and clevis joint.

By using, as a rupturable element, one which will shear under load, a tendency for the operational parameters of the closing mechanism to alter over a period of time under load, will be reduced. Most conveniently the rupturable element is cylindrical, of uniform cross section, and is most advantageously provided by a cylindrical needle of a roller bearing.

According to this invention there is provided a processing plant, explosion relief means adapted to be mounted over an opening in the processing plant, to provide relief for the plant in the event of an internal explosion, said relief means comprising:

(a) a mounting device adapted to be secured to the plant adjacent to the opening;

(b) a securing device adapted to be secured to the plant on the side of the opening generally opposite to the mounting device;

(c) a door assembly adapted to be mounted on the mounting device for pivotal movement relative thereto;

(d) closing mechanism operative between the door assembly and the securing device to hold the door assembly in a closed position relative to the opening, said closing mechanism being adapted to allow the door assembly to open when the pressure within the plant rises above a predetermined pressure; and (e) an elongate tension member adapted to be mounted so as to extend across the door assembly and which is operative, subsequent to initial opening movement of the door assembly, to engage the door assembly and to apply a force to the door assembly acting to move the door assembly towards its closed position.

The closing mechanism will be such that, when the pressure within the plant rises above what is considered to be an optimum safe pressure, the closing mechanism will allow the door assembly to open, to vent the pressure building up within the plant through the opening.

By the provision of the elongate tension member, the door assembly is allowed initially to open unimpeded allowing a speedy venting of the pressure building up within the plant. However subsequent to such opening movement of the door assembly, the tension member, in exerting a closing force on the door assembly, ensures a subsequent return of the door assembly to its closed position, to reduce or prevent the drawing or air into the plant subsequent to the internal explosion, whereby to minimise the possibility of occurrence of any further internal explosion.

Desirably, in addition, the tension member is arranged to limit opening movement of the door assembly, to reduce strain between the door assembly and the mounting device.

Advantageously the tension member is anchored to the plant on opposite sides of the opening, conveniently by means of posts extending outwardly from the plant, one on either side of a line extending between the mounting device and the closing mechanism. In this manner, the tension member need not impede opening movement of the door assembly until such opening movement is in an advanced stage. Preferably the tension member is secured to a part of the door assembly on the side thereof generally opposite to the pivotal mounting of the door assembly. In this manner, when the door is fully open, and the tension member comes under tension, the forces acting on the door assembly are less likely to damage the mounting of the door assembly on the mounting device.

Advantageously the tension member is arranged to undergo permanent deformation during opening movement of the door assembly under explosive conditions. In this manner, some of the kinetic energy of the door assembly, in consequence of its violent movement from its closed towards its open position under the forces of the internal explosion, will be absorbed, to reduce the velocity of movement of the door assembly towards its closed position.

Most conveniently the tension member is provided by a chain.

DETAILED DESCRIPTION OF THE PREFERRED EMBODIMENT

The explosion relief means which is the preferred embodiment of this invention is designed for use as part of a coal-preheating plant operating on coal of a nominal $\frac{1}{8}''$ particle size, at an internal temperature of 260° C., and a working pressure of 2 p.s.i.g. One of the designed criteria of the embodiment is that pressure relief means should be effective when the pressure within the plant rises to 4 p.s.i.g.

Figure 1:
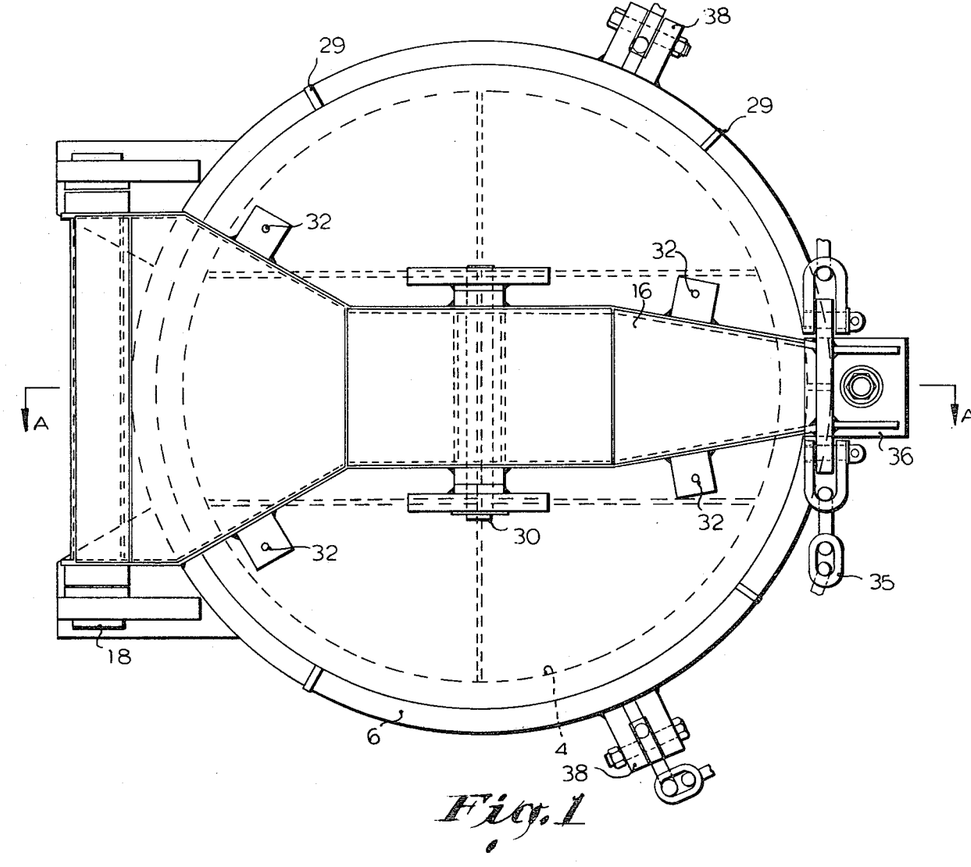
FIG. 1 is a front elevation of explosion relief means for a processing plant, which is a preferred embodiment.
Figure 2:
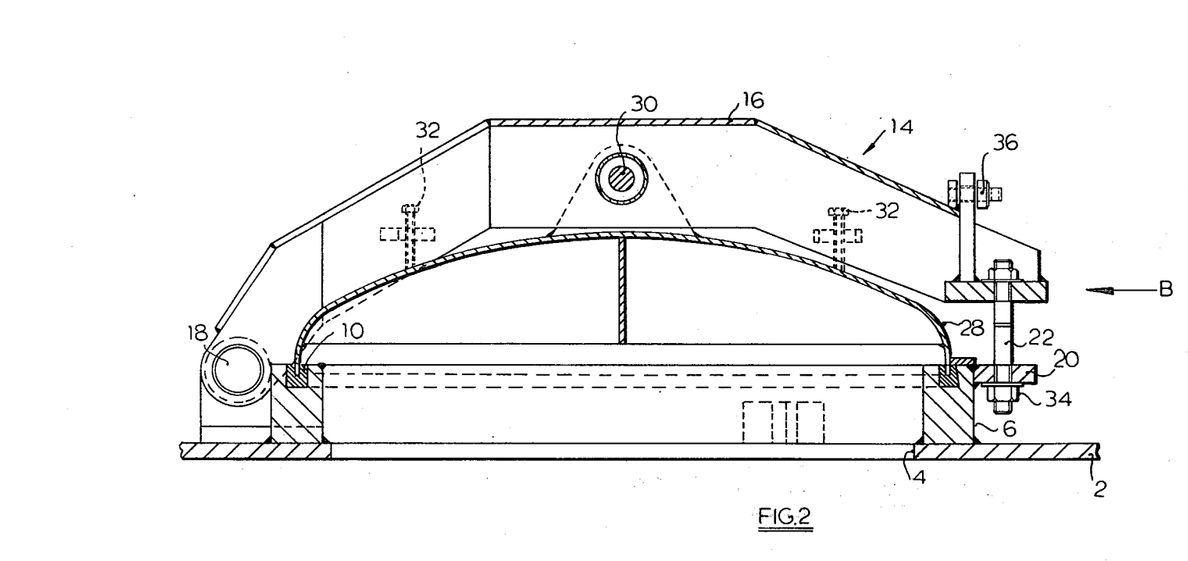
FIG. 2 is a sectional view, taken on the line A-A of FIG. 2.
Figures 3, 4, 5:
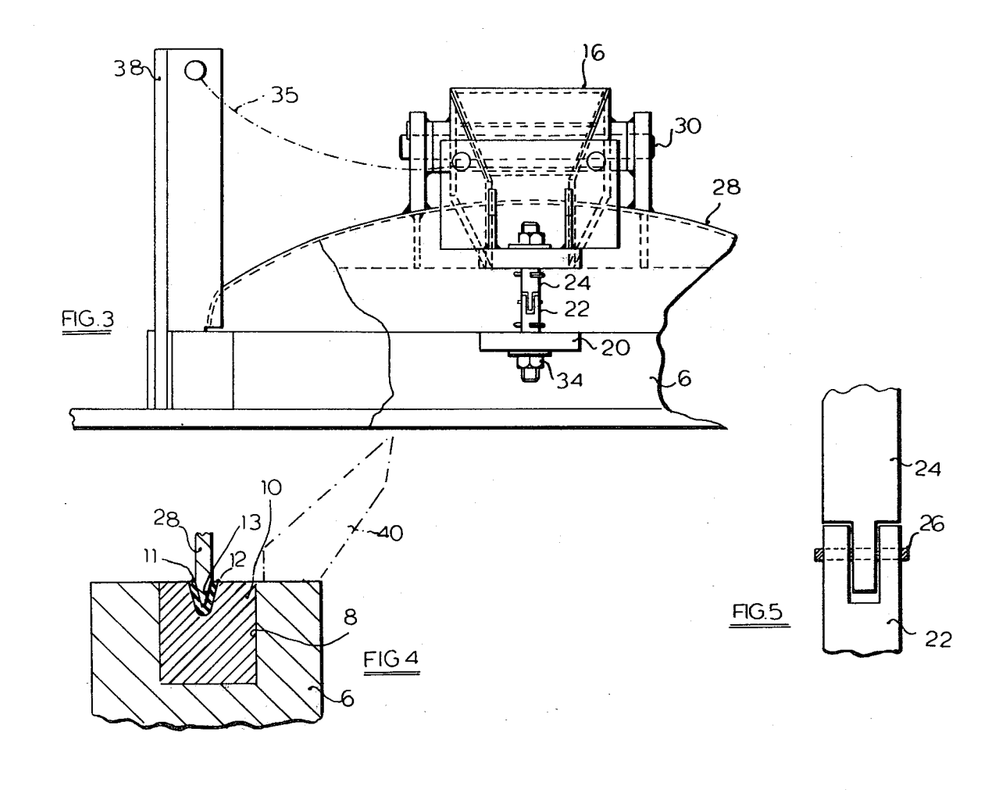
FIG. 3 is a side elevation taken in the direction of the arrow B of FIG. 2.
FIG. 4 is an enlarged view showing pressure relief means of the embodiment.
FIG. 5 is an enlarged view showing securing means of the preferred embodiment.

The explosion relief means comprises an annular wall 6 bounding a relief opening 4 provided on the plant wall 2 on the exterior thereof, and a door assembly 14 pivotally mounted on a mounting device 18 secured to the wall 2 along one side of the opening 4. The door assembly comprises a supporting arm 16 which is pivotally mounted on said device 18, and which extends generally diametrically across the opening 4. The door assembly also comprises a concave, generally dish-shaped door 28 secured to the supporting arm 16 by a single pivot 30, positioned at a central portion of the supporting arm intermediate its opposite end portions, the axis of the pivot 30 extending generally parallel to the axis of the pivot 18.

The door 28 comprises a generally circular lip, a leading end portion of which is tapered (see FIG. 4), the angle included by the taper being approximately 30°.

Provided in the annular wall 6 is a peripheral, outwardly-facing channel 8, and located within the channel 8 is a primary sealing member 10 afforded by a gasket 10 of refractory cement, which itself provides an annular outwardly-facing channel 11. Said channel 11 is lined with a secondary sealing member in the form of lining 12 of a resilient material, specifically a silicone rubber, said lining 12 providing an outwardly-facing peripheral groove 13 which in cross-section is similar to that of the lip of the door 28. When the door assembly is closed, the lip of the door is received within the said groove 13, the engagement between the tapered surfaces of the lip and the complementary surfaces bounding the groove providing a major part of an air-tight seal between the annular wall 6 and the door 28. Thus, only a relatively small closing force need be applied to the door assembly to effect an adequate seal.

Secured to the wall 2 on the side of the relief opening opposite the mounting device is a securing device provided by a bracket 20, to which the end portion of the supporting arm 16, opposite to that end portion pivotally mounted on the device 18, may be secured by a closing mechanism.

The closing mechanism comprises a fork-and-clevis joint, the fork 22 of which extends from the bracket 20 and the clevis 24 being pivotally secured to the supporting arm 16. The closing mechanism also comprises a rupturable element, afforded by a needle 26 of a needle roller bearing which is inserted through cross bores in the fork-and-clevis joint and affords a coupling element therefor to retain them in proximate relationship.

The construction and arrangement of the fork-and-clevis joint is such as to place the element 26 under shear stress in two, spaced, parallel planes, the clevis subjecting the element 26 at a generally central region thereof to a force in a first, upward direction (FIG. 5) and the fork subjecting outer regions of the element to two parallel forces opposite to said first direction and on opposite sides thereof.

The door assembly also comprises means to move the door relative to the supporting arm about its pivotal mounting thereon into a desired position, specifically during setting up of the pressure relief means as hereinafter described and subsequently to retain the door in said desired position. This means is provided by four bolts 32 screw-threadedly received within brackets secured to the supporting arm, and which may be tightened to bear against the door 28 itself.

In setting up the explosion relief means which is the preferred embodiment of this invention, the bolts 32 are tightened to centre the door 28 on the pivot 30, and to prevent subsequent pivotal movement of the door relative to the supporting arm. The door assembly is then moved towards its closed position, the rim of the door 28 entering the groove 8 provided in the annular wall 6. A correct position of the door 28 may be ensured by adjustment of the bolts 32, until the stops 29 provided on the periphery of the lip of the door 28 all rest on the annular wall 6. The door assembly is then opened, and the lip coated with (polytetra-fluroethylene) P.T.F.E. release agent.

The channel 8 is filled with a settable mixture, provided by one part cement fondu, one fifth volume of ball clay and two volumes of 24 mesh fire clay grog. The mixture is reasonably quick setting, and the ball clay gives to the mixture a consistency which allows the channel to be filled with the plane of the relief opening 4 either in a vertical or a horizontal disposition. The door assembly is then gently closed, the lip of the door entering the settable mixture provided in the channel 8.

After about fifteen hours, the door assembly is gently opened, and the mixture (which, in its cured condition, provides a primary sealing gasket 10) is allowed to dry out further if necessary. Upon completion of drying out, a bead of silicon rubber compound is laid into the bottom of the tapered channel 11. The door is then reclosed, and excess rubber mixture is squeezed from the channel 11, providing in effect a gasket in the form of a lining 12 on the interior of the channel 11. On completion of setting of the silicon rubber mixture, the bolts 32 may be loosened, allowing the door 28 to move about its pivot 30, and the explosion relief means may be used to relieve pressure in the operation of the coil pre-heating plant.

In use of the explosion relief means, the door assembly is closed manually, and the fork 22 of the closing mechanism is inserted in a U-shaped opening in the flange 20. A nut 34, screw-threadedly received on an outer end portion of the fork 22 may then be tightened, to bear against the flange 20 and draw the door assembly firmly down into its closed position. However, because the seal between the door 28 and the annular wall 6 is effected primarily between surfaces extending at an angle to the plane of the relief opening (specifically at 75° to the plane of the opening), only a small pressure need be applied to the fork-and-clevis joint to draw the door assembly down into its fully closed position. Thus, during normal operation of the plant, there will be little strain placed upon the needle 26 retaining the fork-and-clevis in their proximate relationship. Thus, the needle 26 may be caused to shear, and consequently to allow opening of the door assembly, with a relatively small increase in the internal plant pressure. Typically, the needle 26 is designed to shear when the pressure within the plant rises to 4 p.s.i.g., viz. twice the normal operating pressure. In addition both the fork-and-clevis were provided with pins, shown in FIG. 3, to prevent them from separating from the bracket 20 and arm 16, respectively, during explosive opening of the door.

When the door assembly opens, in the event of an internal explosion within the plant, the door moves initially predominantly normally from the opening, there subsequently being a small additional sideways component as the leading edge of the door moves from the groove. The geometry of the door, together with the resilience of the silicone rubber and the frictional forces acting between the lining 12 and the edge portion of the door may in fact impose a limitation on the angle of taper. In the preferred embodiment, we prefer to use an angle of taper approximately tan-1 coefficient of friction between the two materials, providing a taper which includes an angle of about 30°. The relief means which is the preferred embodiment of this invention also comprises restraining means, provided by an elongate tension member adapted to be mounted so as to extend over the door. The elongate tension member is afforded by a chain 35, which is anchored to the plant on opposite sides of the relief opening 4, specifically to two posts 38 which extend outwardly from the plant, one being disposed on either side of the opening 4. The chain 35 is secured at a central portion thereof to a part 36 of the supporting arm adjacent to the closing mechanism, said posts 38 being disposed one on either side of a line extending between the mounting device and the closing mechanism (see FIGS. 3 and 4).

The position at which the ends of the chain 35 are anchored to the posts 38 is higher than the part 36 of the supporting arm, and thus the chain does not exert any force on the door during initial opening thereof. Subsequent movement of the door is effective to stretch the chain 35, causing the chain to exert a force on the door which is effective to return the door towards its closed position.

Where the relief opening 4 lies in a horizontal plane, the door would return to its closed position solely under the aid of gravity. Where the relief opening 4 lies in a vertical plane, the pivot 18 should be mounted above the opening, whereby the door assembly may similarly return to its closed position under the effect of gravity alone. However, the use of a chain performs the function of speeding up door closure subsequent to an internal explosion. Thus, it has been found that, by the use of the preferred embodiment, immediately subsequent to opening of the door assembly, and relief of explosive pressure, the door assembly closes very rapidly and thus prevents air from being drawn into the plant subsequent to such internal explosion, and thereby minimises the possibility of occurrence of any further internal explosion. It will of course be appreciated that, immediately subsequent to an internal explosion, and venting of excess pressure, there exists a slight negative pressure differential between the inside of the plant and the external atmosphere, which will retain the door assembly in its closed position without the need for any further securing means.

In the preferred embodiment, tilting of the door 28 about the pivot 30 is retained to a minimum by appropriately setting the bolts 32. Thus, in the event that the door 28 does not centralise on the pivot 30 during closure of the assembly, engagement between the leading side of the door is with a part of the wall 6 adjacent to the primary seal causing the door to become centralised on the pivot during final closing of the door. In this manner, the leading edge portion of the door invariably enters the groove 13 upon closure. However, if desired, guidance means in the form of guide plates 40 (shown in dotted lines in FIG. 4) may be utilised to ensure centralisation of the door 28 upon the pivot 30 prior to engagement thereof with the wall 6, or with the sealing gaskets 10, 12.

The explosion relief means which is the preferred embodiment of this invention was tested in the venting of an explosive mixture of 3% to 4% propane in air, contained in a pressure vessel of 5'6" diameter and 15' in height. In the test carried out, the relief opening was in a horizontal plane, and the door was 2'6" in diameter, a 2 millimeter shear pin being used to restrain opening of the door assembly.

Following spark ignition of the above mixture, the time taken for breakage of the needle 26 was approximately 100 milliseconds. From pin breakage to movement of the door assembly to its fully open position took approximately 50 milliseconds. Thereafter, it was observed that the door returned to a position adjacent to its closed position, but a further explosion took place before the door could attain its fully closed position. In all, three successive explosive fronts caused the door assembly to move in a direction from its closed towards its open position three times, prior to final movement of the door into its fully closed position. Final movement of the door from its fully open to its fully closed position took approximately 200 milliseconds.

Thus, in the preferred embodiment, the door assembly opened sufficiently quickly to provide acceptable venting of the internal explosion. However, additionally, the door moved towards its closed position sufficiently rapidly to minimise the subsequent drawing of air into the pressure vessel.

In addition, it was found that, although some distortion of the door might occur during the course of this movement, the door was capable of providing an adequate seal with the silicone rubber gasket to a highly satisfactory extent.

In commercial use of the preferred embodiment, subsequent to the running down of the plant of which the explosion relief means forms part, the most that is necessary is that the grout be removed from the channel 8, and further primary and secondary gaskets be provided as set out above. However, on many occasions, all that was necessary was that a further bead of silicone rubber be inserted within the groove 13, prior to closure of the door assembly, to provide (on curing) a wholly satisfactory seal. In addition, of course, a further needle was required to be used in place of the fractured needle.

Thus, in commercial use of the explosion relief means, after an internal explosion, the door assembly can be used satisfactorily during continued operation of the furnace with a minimum amount of work and expense.

Experimentation to assess the performance of the preferred embodiment

The following tests were carried out on the explosion relief means which is the preferred embodiment of this invention, to determine the effect of the door assembly in the venting of internal explosions. In carrying out the tests, the door assembly was mounted over a relief opening of approximately 70 centimeters diameter provided in a 300 foot cubed pressure vessel. A 2 mm. shear needle was fitted to the fork-and-clevis joint, and the door was closed. Metered quantities of propane were admitted to the pressure vessel at the bottom, whilst displaced air was vented through a valve at the top. The propane and air were thoroughly mixed for two minutes by an internal fan, and after a further five minutes the mixture was ignited by the use of a spark induced at a position three foot below the door. The explosion pressure was monitored by two acceleration-compensated piezo-electric gauges, one close to the relief opening and the other remote therefrom, the gauges providing signals for an oscilloscope. In some tests it was possible to obtain a graph of the speed of opening movement of the door by use of a high speed cine film.

Test No. 1

The pressure vessel was filled with 2.6% propane/air mixture, which was stirred and exploded. After the explosion the door was observed to be in its closed position with the lip of the door in sealing engagement within the channel, providing a very good seal against an internal vacuum within the pressure vessel. The chain arms 38 were bent, and the chain had been stretched.

Figure 6A:
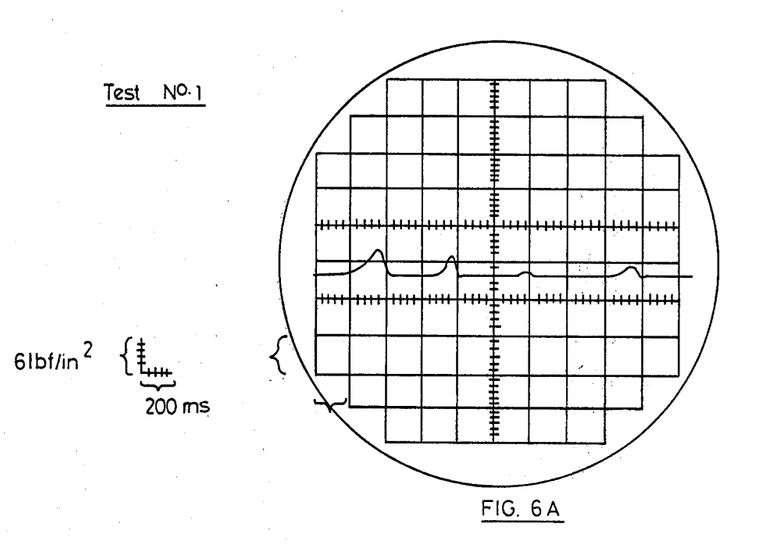
FIGS. 6 to 13 are related to various tests to which the preferred embodiment was subjected.
Figure 6B:
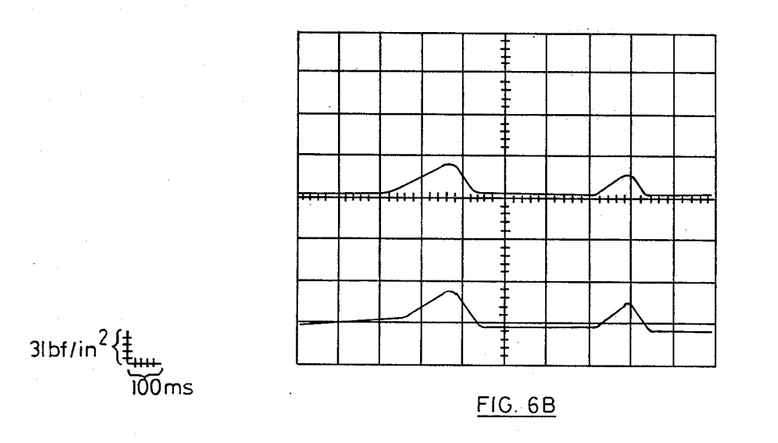

FIG. 6A shows the explosion pressure monitored by the gauge remote from the relief opening; the upper trace in FIG. 6B is the trace of the same gauge, and the lower trace illustrates the pressure measured by the gauge situated near the relief opening. Three explosion peaks were noted, the first peak, indicating maximum pressure when the door opened, the following peaks being the result of the disturbance to combustion caused by movement of the door.

Test No. 2

The door assembly was closed as in Test 1, and the pressure vessel was filled with 3.5% propane/air mixture, which was stirred and exploded.

Figure 7:
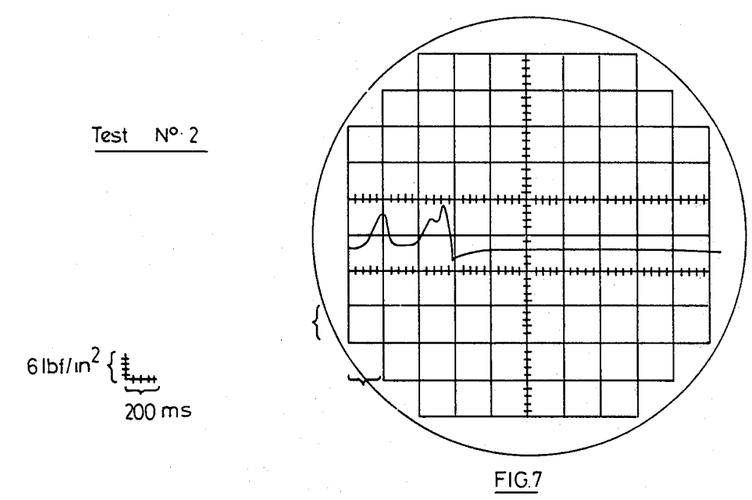

The explosion was observed to be violent, and the door opened to its full extent, and as the door was falling back, it opened fully again, and finally dropped back to its closed position. As in Test 1, the door was observed to be in its closed position, providing a very good seal against an internal vacuum. The chain arms were not apparently bent, but the chains were badly over strained. FIG. 7 shows the pressure measured by the gauge situated remote from the relief opening; two pressure peaks are evident, the second being slightly larger than the first.

Test No. 3

The door assembly was closed as in Test 1, the tank was filled with 3.25% propane/air mixture, which was stirred and exploded. Again a double explosion was observed. The first explosion blew the door fully open, and when it had closed back to approximately 45°, the second explosion blew it fully open again.

Figure 8A:
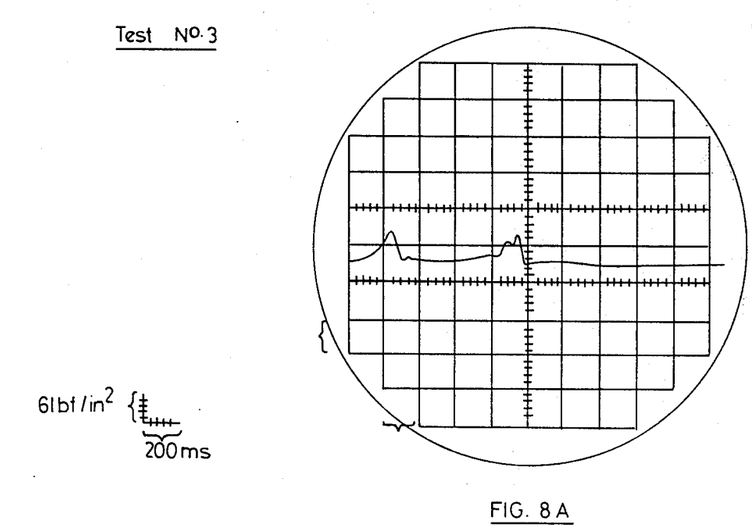
Figure 8B:
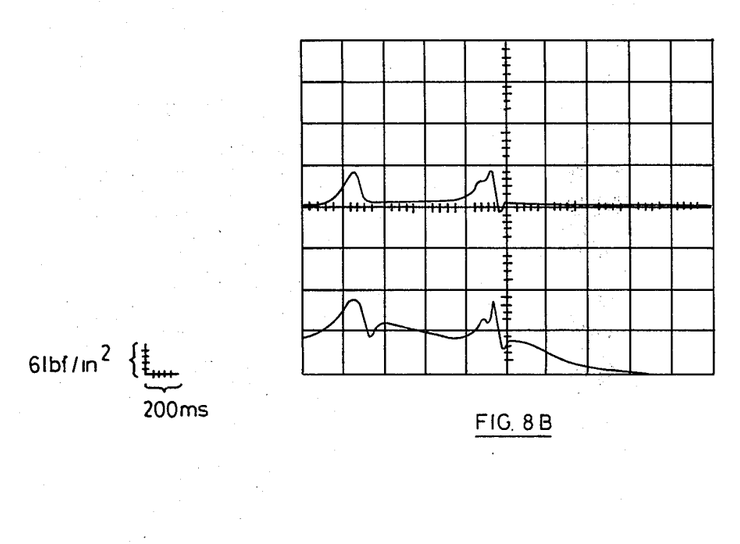

FIG. 8A shows the trace of the pressure recorded by the gauge situated remote from the relief opening: the upper trace of FIG. 8B also shows a trace of this gauge, and the lower trace shows the pressure recorded by the gauge situated close to the relief opening. After the second peak, this latter trace shows a downward deflection which was caused by the heat of the advancing flame front.

Test No. 4

The door assembly was closed as specified in Test No. 1, and the tank was filled with 3.5% propane/air mixture, which was stirred and exploded.

Again a double explosion was observed, the door being opened approximately 30° by the first explosion when it was caught by the second explosion and fully opened, the chain arms were bent, and the chain has been stretched, and the lip of the door was not completely sealed in the channel, but had moved ⅛ inch towards the hinge pins and to one side of the channel.

Figure 9A:
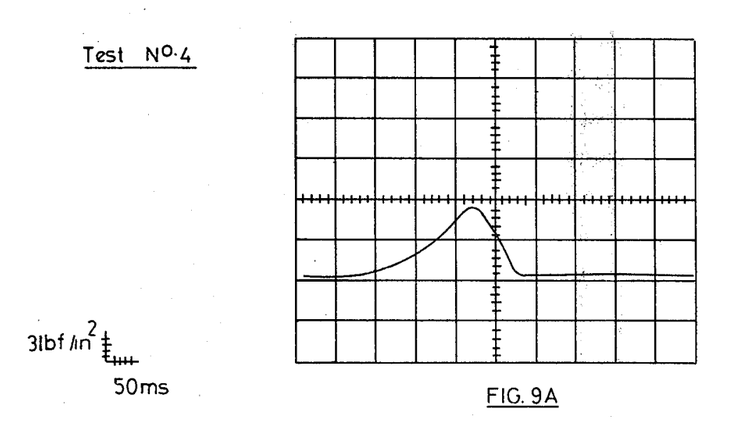
Figure 9B:
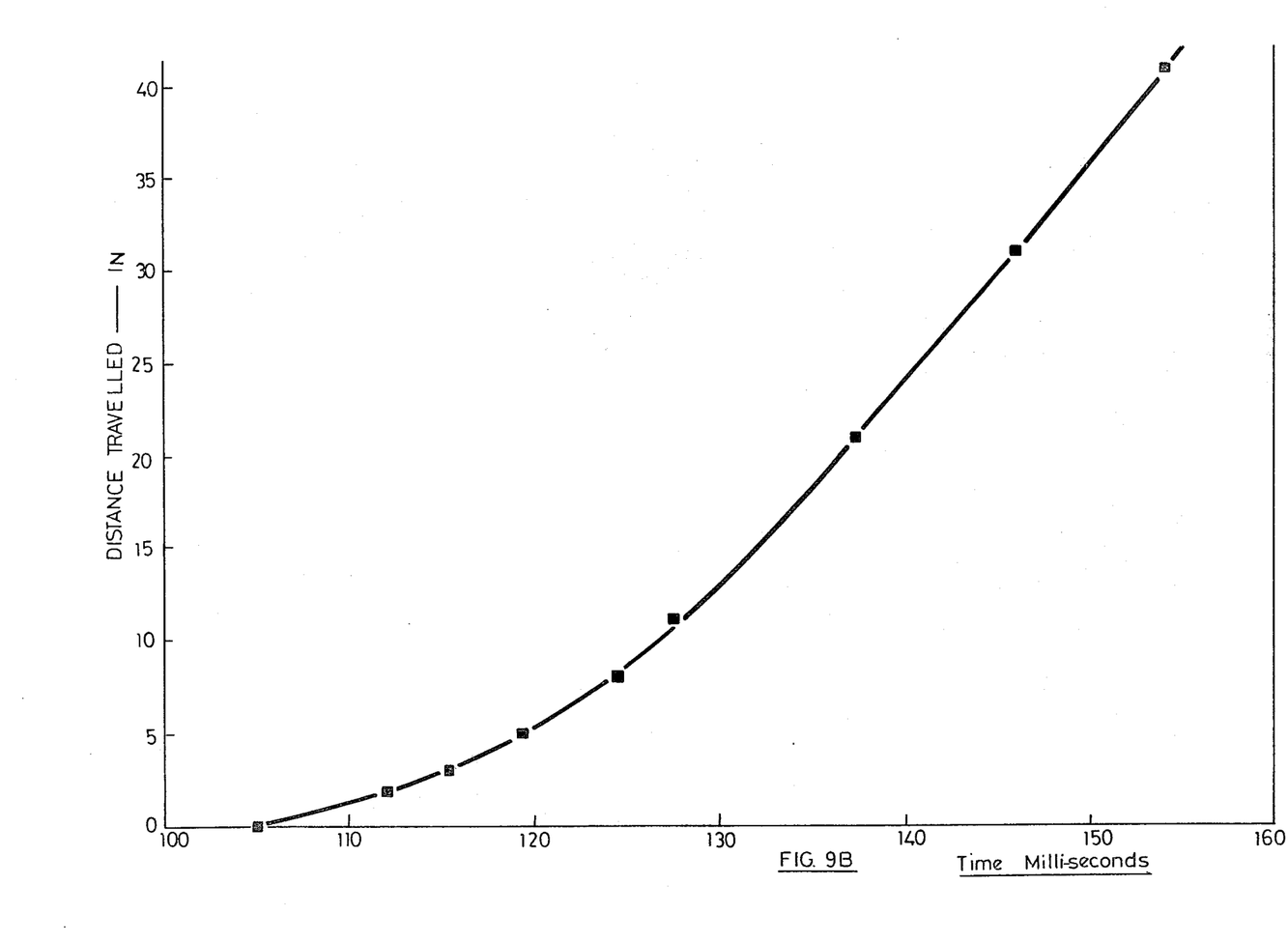

FIG. 9A shows the pressure recorded by the gauge situated remote from the relief opening. Because of the expanded time base, only the initial peak of the explosion was recorded. FIG. 9B shows the movement of the door plotted against time from the point of ignition. The door commenced to move 105 ms. after the gas was ignited, and reached its fully open position after a further 47 ms. At the later stages of opening, the door ceased accelerating and moved at a constant velocity. Thus, it took the door 152 ms. after ignition to open fully.

From FIG. 9A, it was seen that it took 110 ms. from ignition to maximum pressure, and another 50 ms. for the pressure to fall to ambient level. Thus, the door commenced to open 5 ms. before the first pressure peak was reached, and was fully open 10 ms. after the pressure within the vessel fell to ambient level.

Test No. 5

The door assembly was closed as before, the tank was filled with 4.0% propane/air mixture, which was stirred and exploded.

Figure 10A:
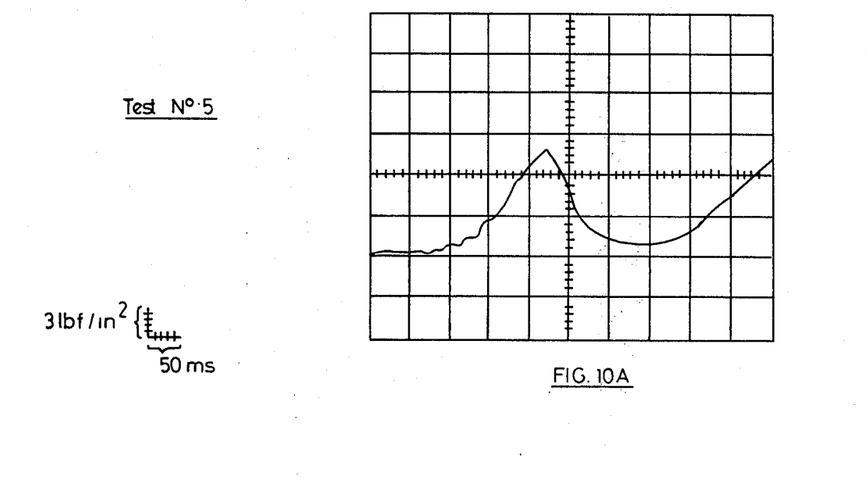
Figure 10B:
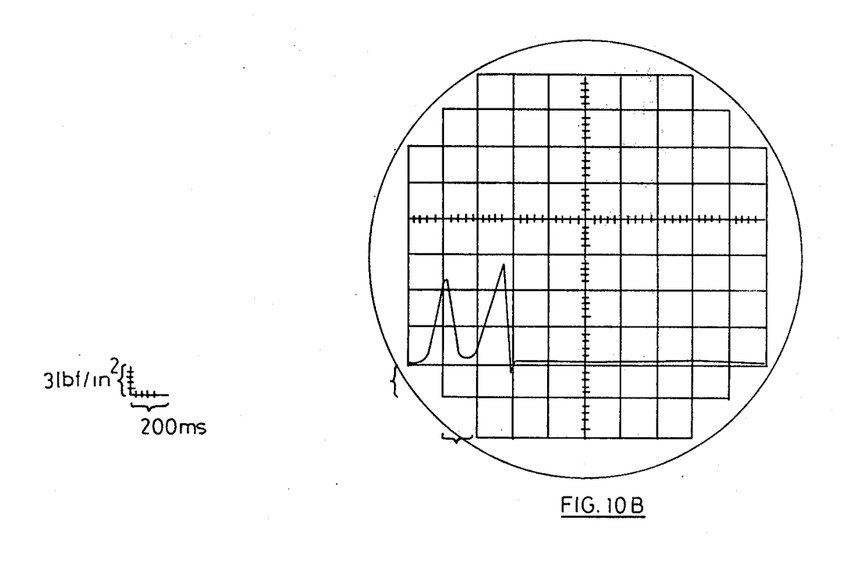

A very violent double explosion was observed. The door blew straight back to its fully open position, as permitted by the restraining chains, and fell back to its closed position with the lip of the door in sealing engagement within the channel, providing a very good seal against an internal vacuum. FIG. 10A shows the pressure record of the gauge remote from the relief opening, and shows one peak only, because of the expanded time base. FIG. 10B however shows both explosion peaks.

Test No. 6

The door assembly was closed as before, the pressure vessel was filled with 3.0% propane/air mixture, which was stirred and exploded.

A violent triple explosion was observed. The first explosion had opened the door approximately 30° when the second explosion hit it, and opened it fully. As the door was closing, the third explosion blew it fully open again. The door fell back to its closed position, the lip of the door entering the groove into sealing engagement with the gasket, providing a very good seal against an internal vacuum. The chain arms were bent considerably, and the chain had been stretched.

Figure 11A:
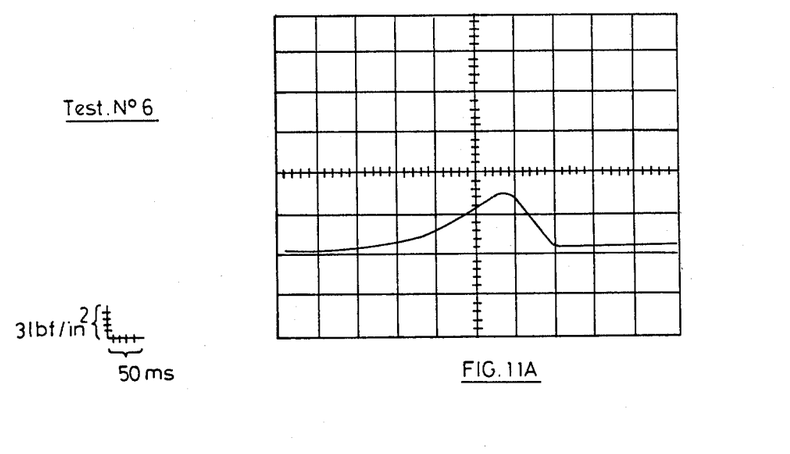
Figure 11B:
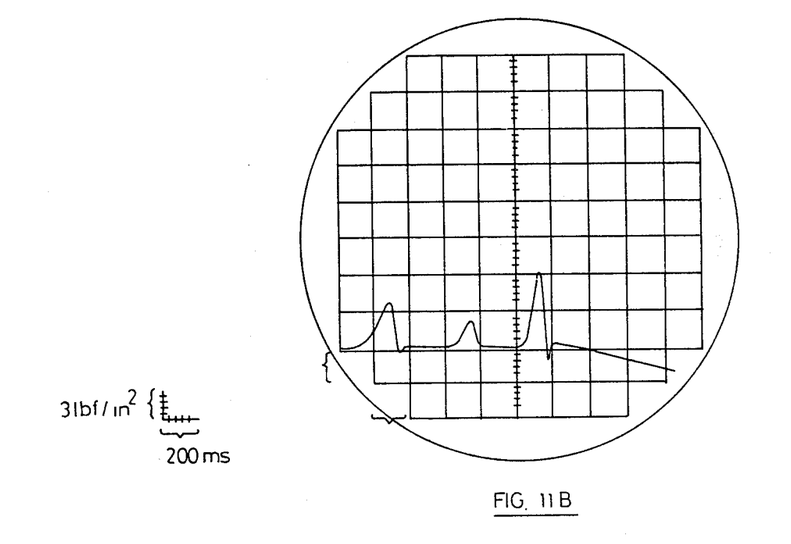
Figure 11C:
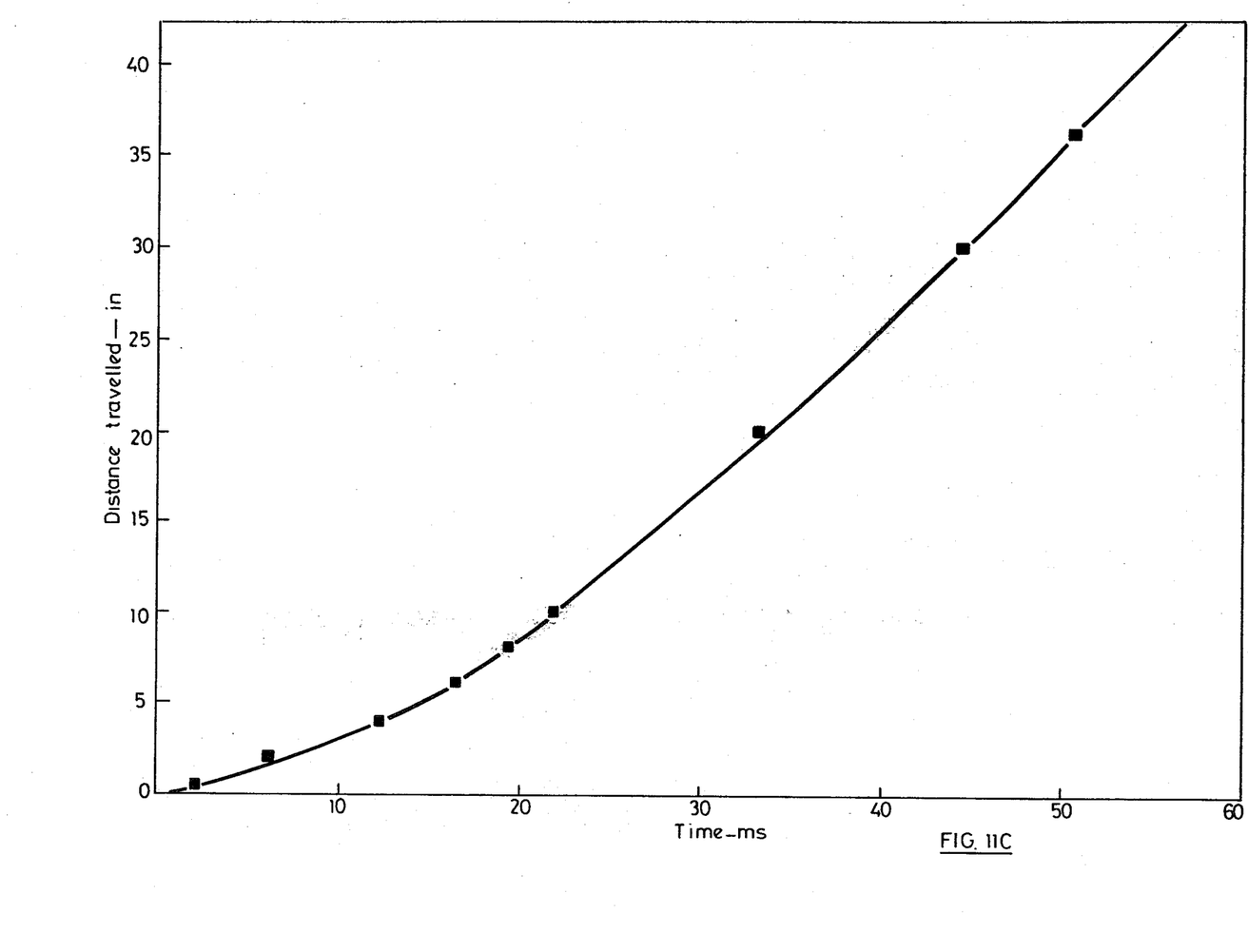

FIG. 11A shows the pressure record reached by the gauge remote from the relief aperture, and FIG. 11B shows the pressure record registered by the gate adjacent to the relief aperture. In FIG. 11A only the first peak is shown, because of the extended base line: however, FIG. 11B shows three peaks in agreement with the movement of the door detected visually, and confirmed by a high speed cine record. FIG. 11C shows a plot of door movement against time, but because the camera failed to register the event of ignition, only the time for opening of the door from commencement of the movement is given, which was 55 ms.

Figure 12:
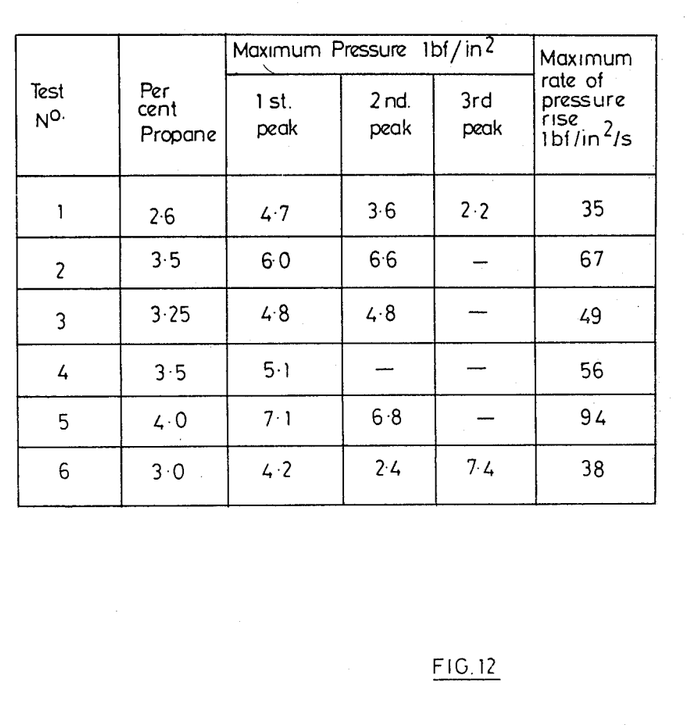

FIG. 12 is a table illustrating the maximum pressure recorded, and the maximum rate of pressure rise, of the six tests: it will be observed that n no test did the pressure in the pressure vessel rise to an undesirable level, viz above two times the ambient pressure within the vessel.

Figure 13:
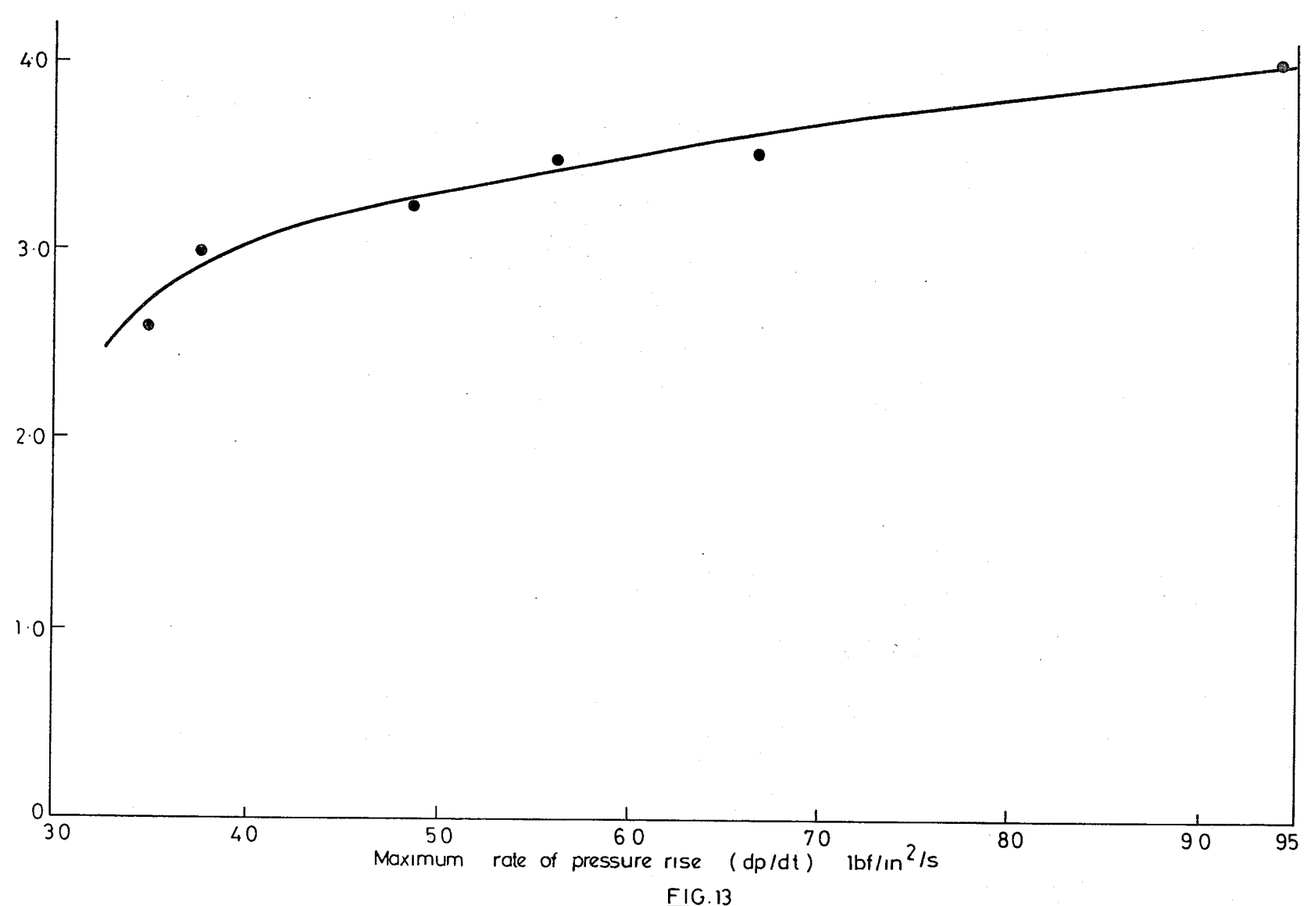

FIG. 13 is a graph showing the maximum rate of pressure rise, as a function of proportion of propane in the propane/air mixture.

From the tests carried out, the following points were noted:

1. The chains 35 and chain arm 38 were invariably subjected to a large force during the relieving of an explosion, and were distorted to a greater or lesser extent. Such distortion is important in the relieving of the explosion, since it involves absorption of kinetic energy from the door, and also serves to protect the hinge. In practice, it was found desirable to replace the chains 35 and chain arm 38 after each explosion.

2. The load under which the shear pin 26, provided by a bearing needle, fractured depended upon the pin being subjected essentially to shear forces. This requires the apertures in fork 22 and clevis 24 to be as sharp as possible. In practice, after an explosion, the fork/clevis/shear pin was replaced as a unit, preferably being protected from environmental conditions by a plastics sleeve shrink-wrapped onto the unit.

By the use of the invention, it was found possible to provide explosion relief means for a plant operating at high internal pressure (viz. 60 lbs/square foot and above) which operated very satisfactorily.

In addition, it was found possible to provide explosion relief means which was operative in venting a building up of internal pressure at a level not more than three times, and possibly not more than twice, the normal working pressure.

In addition, it was found possible to provide explosion relief means which, subsequent to operation to vent a building up of internal pressure, will revert to a closed position to prevent air from being drawn into the plant.

Whereas the invention the subject of this application is useful in coal pre-heating plants, e.g. preparatory to a coking operation, it will be appreciated that the invention as such is not to be considered as being in any way restricted to any particular type of manufacturing and/or processing operation.

Whereas the invention is described in relation to its use in processing plant operating at a pressure above 60 lbs/square foot, the invention shows marked superiority to presently available explosion relief means operating at a pressure above 100 lbs/square foot.

I claim:

1. In or for a processing plant, explosion relief means adapted to be mounted over an opening in the processing plant, to provide relief for the plant in the event of an internal explosion, said relief means comprising
    (a) a mounting device adapted to be secured to the plant adjacent to the opening;
    (b) a securing device adapted to be secured to the plant on the side of the opening generally opposite to the mounting device;
    (c) a door assembly adapted to be mounted on the mounting device for pivotal movement relative thereto;
    (d) closing mechanism operative between the door assembly and the securing device to hold the door assembly in a closed position relative to the opening, said closing mechanism being adapted to allow the door assembly to open when the pressure within the plant rises above a predetermined pressure; and
    (e) an elongate tension member adapted to be mounted so as to extend across the door assembly and which is operative, subsequent to initial opening movement of the door assembly, to engage the door assembly and to apply a force to the door assembly acting to move the door assembly towards its closed position.

2. Explosion relief means according to claim 1 wherein the door assembly comprises a door which, as viewed from the relief opening, is concave.

3. Explosion relief means according to claim 2 comprising a resilient sealing member adapted to be secured to the plant around the opening, adapted when the door assembly is closed to be engaged by a peripheral edge portion of the door.

4. Explosion relief means according to claim 3 wherein said peripheral edge portion of the door is tapered.

5. Explosion relief means according to claim 4 wherein said tapered edge portion of the door when the door is closed is located in a channel formed in the sealing member.

6. Explosion relief means according to claim 5 wherein said channel is formed by said tapered edge portion.

7. Explosion relief means according to claim 1 wherein the door assembly comprises a supporting arm, one end portion of which is adapted to be pivotally mounted on the mounting device, and upon which the door is mounted.

8. Explosion relief means according to claim 7 wherein the door is mounted on the supporting arm for pivotal movement relative thereto.

9. Explosion relief means according to claim 8 comprising means which is adjustable to cause pivotal movement of the door relative to the supporting arm to a desired position, and to restrain subsequent pivotal movement relative thereto.

10. Explosion relief means according to claim 1 wherein the tension member is anchored to the plant on opposite sides of the opening.

11. Explosion relief means according to claim 10 wherein the tension member is secured to posts extending outwardly from the plant, one on either side of a line extending between the mounting device and the closing mechanism.

12. Explosion relief means according to claim 10 wherein the tension member is secured to a part of the door assembly on the side thereof generally opposite to the pivotal mounting of the door assembly.

13. Explosion relief means according to claim 1 wherein the tension member is arranged to undergo permanent deformation during opening movement of the door assembly under explosive conditions.

14. Explosion relief means according to claim 1 wherein the tension member is provided by a chain.

15. Explosion relief means according to claim 1 wherein the closing mechanism comprises means to transmit forces tending to open the door assembly to the rupturable element as shear forces.

16. Explosion relief means according to claim 15 wherein said means to transmit forces tending to open the door assembly to the rupturable element, is operative to transmit such forces as a force acting on a central region of the element in one direction, and forces acting on outer regions of the rupturable element in parallel directions opposite to said one direction.

17. Explosion relief means according to claim 16 wherein said means to transmit forces tending to open the door assembly to the rupturable element comprises a fork-and-clevis joint, the rupturable element affording a coupling element of said fork-and-clevis joint.

18. Explosion relief means according to claim 1 wherein the rupturable element is cylindrical and of uniform cross section.

19. Explosion relief means according to claim 18 wherein said rupturable element is provided by a cylindrical needle bearing.

* * * * *